United States Patent [19]

Legrand et al.

[11] Patent Number: 4,589,984
[45] Date of Patent: May 20, 1986

[54] APPARATUS FOR SEPARATING FROM EACH OTHER THE COMPONENTS OF A MIXTURE OF OIL, WATER AND SOIL

[76] Inventors: Hubrecht L. Legrand, Populierenlaan 6A, 3735 LH Bosch En Duin; Hendrik J. Ankersmit, Laan van Borgele 7, 7414 GS Deventer, both of Netherlands

[21] Appl. No.: 642,374

[22] Filed: Aug. 20, 1984

[30] Foreign Application Priority Data

Aug. 22, 1983 [NL] Netherlands ............. 8302941

[51] Int. Cl.⁴ ............................. B01D 17/028
[52] U.S. Cl. ..................... 210/522; 210/537; 210/540
[58] Field of Search ........... 210/521, 522, 537, 540, 210/530, 802, 519, 242.1, 242.3, 533

[56] References Cited

U.S. PATENT DOCUMENTS

| 1,940,794 | 12/1933 | Fisher | 210/522 |
| 2,058,044 | 10/1936 | Spencer | 210/533 |
| 3,052,359 | 9/1962 | Rounds | 210/521 X |
| 3,510,006 | 5/1970 | Cheysson | 210/540 X |
| 3,919,084 | 11/1975 | Bebech | 210/802 |
| 3,923,659 | 12/1975 | Ullrich | 210/521 X |
| 4,123,365 | 10/1978 | Middelbeek | 210/521 |
| 4,133,771 | 1/1979 | Pielkenrood | 210/521 X |
| 4,136,012 | 1/1979 | Lovboutin et al. | 210/521 X |
| 4,176,068 | 11/1979 | Ankersmit | 210/295 |
| 4,264,454 | 4/1981 | Ankersmit | 210/787 |
| 4,299,703 | 11/1981 | Bezard et al. | 210/522 X |
| 4,396,508 | 8/1983 | Broughton | 210/522 X |

FOREIGN PATENT DOCUMENTS

| 2033021 | 1/1971 | Fed. Rep. of Germany . |
| 2046470 | 5/1971 | Fed. Rep. of Germany . |
| 2204575 | 5/1974 | France . |
| 2255091 | 7/1975 | France . |
| 2483799 | 12/1981 | France . |
| 88003 | 4/1953 | Netherlands . |
| 106041 | 9/1963 | Netherlands | 210/521 |
| 7804913 | 11/1978 | Netherlands . |
| 782826 | 11/1980 | U.S.S.R. | 210/522 |

Primary Examiner—Richard L. Chiesa
Attorney, Agent, or Firm—Hammond & Littell, Weissenberger & Dippert

[57] ABSTRACT

Apparatus of separating from each other the components of a mixture of water, oil and soil, such as sludge, which mixture is passed via a distribution and pacification chamber (7), which is connected to the supply pipe (2) and which has a large volume slowing down the speed of flow, into a separation chamber (3, 4, 5) where the flow of the mixture is first guided upwards in a laminar flow through a first bundle of plates (16) having vertical flow passages, the flow being reversed, while retaining laminar flow, directly after leaving the said first bundle of plates (16) and guided downwards through a second bundle of plates (17) having vertical flow passages which lead into a discharge chamber (33) having a throughflow cross-section increasing towards the discharge opening (34), where the separated components, water and soil, are discharged, while oil can be discharged in the reversing chamber (26) between the first (16) and second (17) bundle of plates.

14 Claims, 1 Drawing Figure

U.S. Patent     May 20, 1986     4,589,984
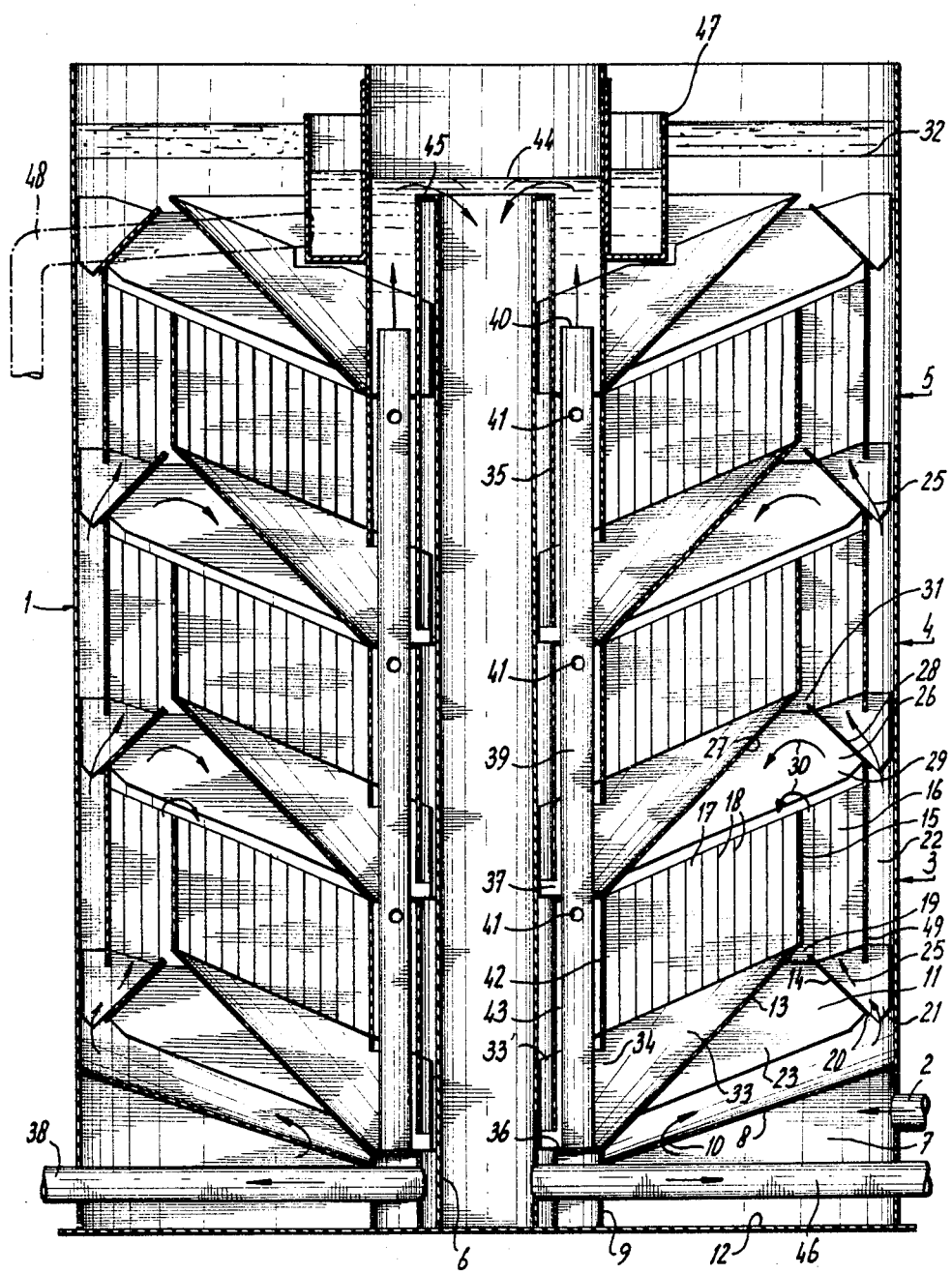

APPARATUS FOR SEPARATING FROM EACH OTHER THE COMPONENTS OF A MIXTURE OF OIL, WATER AND SOIL

The invention relates to a apparatus of separating from each other the components of a mixture of water, oil and soil, such as sludge, this mixture being continuously fed into one or more separation chambers in which the components are separated from one another by reason of their physical properties i.e., gravitational segregation, in such a manner that the oil is collected at the top and continuously discharged, the water is likewise guided towards the top and continuously discharged in a different point than the oil, and the soil is collected at the bottom and continuously discharged, use being made of a laminar flow for the separation of the oil and water.

An apparatus of this kind is known from Dutch laid open patent application No. 7804913. In this known apparatus the mixture of water, oil and soil is injected with great force into funnel-shaped receiver chambers, where separation takes place between the soil and the lighter components, oil and water. These last components, oil and water, are collected at the top of the vessel after the very turbulent separation of the heavier soil, and then discharged therefrom to a horizontal filter device, in which by means of laminar flow they are given the opportunity to separate into the respective components, oil and water, and are discharged separately.

This known apparatus is very large.

The invention seeks to provide an apparatus with which a high separation output is possible with an apparatus taking up less space.

According to the invention this aim is achieved in that the mixture containing all the components is passed via a distribution and pacification chamber, which is connected to the supply pipe and which has a large volume slowing down the speed of flow, into a separation chamber where the flow of the mixture is first guided upwards in a laminar flow through a first bundle of plates having vertical flow passages, the flow being reversed, retaining laminar flow, directly after leaving the said first bundle of plates and guided downwards through a second bundle of plates having vertical flow passages which lead into a discharge chamber having a throughflow cross-section increasing towards the discharge opening, where the separated components, water and soil, are discharged, while oil can be discharged in the reversing chamber between the first bundle and the second bundle of plates.

The invention is thus based essentially on the principle that a laminar flow is also used for the separation of the soil, while after the incoming mass has been brought to rest, the laminar flow zone can be divided into the zone through the first bundle of plates, where a part of the lightest component, namely, the oil, is separated, the reversing chamber in which the oil is further and completely separated, and then the downwardly directed laminar flow which calmly separates the water and the soil from one another.

The invention likewise relates to an apparatus for applying the method according to the invention, which apparatus consists of a vessel provided with a supply pipe for the mixture to be treated, and with separate discharge pipes for oil, water, and soil, this vessel containing one or more separation chambers while this apparatus differs from the apparatus known from the previously mentioned patent application 7804913 in that the vessel is provided in its lower part with a supply chamber of great volume, into which the supply pipe leads and which in its top wall has an opening connected to a separation chamber at the site of the inlet openings of a number of vertical passages of a first bundle of plates, in which separation chamber is situated a second bundle of plates having vertical passages and separated from the first bundle of plates by a wall, above which bundles of plates a reversing chamber is formed which has inclined top walls extending from the ends of the uppermost plates in the bundles of plates to a point situated above the separating wall, forming an outlet opening, while under the outlet openings of the vertical passages of the second bundles of plates an inclined floor is disposed, which extends from the said separating wall to a discharge opening of which the wall part adjoining the floor is connected to the soil discharge outlet, while the upper part thereof is connected to a water discharge outlet.

Many arrangements are known for purifying water, for example, for separating oil and water, wherein the mixture is passed through a bundle of plates which for this purpose, and in order to obtain a sufficiently long path of flow, is inclined. The invention is based on the realization that these paths may be vertical, but that division into an upward and a downward flow is necessary, which leads to a construction which can be compact. Vertical bundles of plates take up less room than inclined bundles, particularly when the usually restricted floor space available is taken into account.

The apparatus can be further improved by disposing vertical partitions both in the supply chamber and in the reversing chamber, these partitions being disposed transversely to the surfaces of the plates of the bundles of plates. These partitions are of importance for maintaining the laminar flows since flow passing out of the first bundle of plates and must enter the second bundle while remaining laminar.

It is also important to maintain flow in the discharge chamber, for example, with vertical partitions. These partitions in the supply chamber, reversing chamber, and discharge chamber, respectively, may have extensions in the bundle or bundles of plates, so that channels are formed in the latter.

For the purpose of maintaining laminar flows, it is in addition of importance that the supply chamber and the reversing chamber should have the same volumes between the respective top walls.

The apparatus may also be so constructed that a plurality of separation chambers are provided in the vessel, these chambers being disposed one above the other and connected in parallel with one another to the mixture inlet and to the water and soil outlet and being disposed, at least partially, serially in respect of the separation of the oil component. Through the connection in parallel of separation chambers disposed one above the other, large amounts of mixture can be treated. Since a part of the separated lightest component, i.e., the oil, flows serially through the separation chambers disposed one above the other, a very compact construction is possible, and it is surprising that the laminar flow pattern is not disturbed thereby.

From the constructional point of view, the apparatus may be so arranged that at the bottom edge of all the bottom plates, at the site of the discharge openings of the discharge chambers, it is provided with guide plates which lead into a soil outlet pipe and through which one or more vertical pipes is or are passed sealingly, these vertical pipes having, under said, plates, inlet openings for water from the discharge openings. The most expedient form of construction of the apparatus is one in which the vessel is in the form of a cylinder, a central column is disposed in the centre of the vessel and is connected to a water discharge pipe, a first jacket is disposed concentrically around the column and has openings above the extensions of the bottom plates, this jacket, together with the column, forming the soil collector pipe which is connected to a soil discharge pipe, a second jacket is disposed concentrically around the first jacket and has openings above the the bottom plates, while in the space between the first jacket and the second jacket vertical pipes are disposed, which have water inlet openings under the plates and an outlet opening at the top end, all the bottom plates or top walls are conical plates having a downwardly and inwardly directed apex angle, and all the top wall plates are conical plates disposed concentrically to one another.

The invention will now be explained with the aid of the drawings, which illustrate schematically in section one example of an embodiment of an apparatus according to the invention, whereby the method according to the invention can be applied.

The apparatus shown in the drawing consists of a vessel 1 having a substantially cylindrical outer wall.

A vessel rectangular in top plan view is however also possible, but has the disadvantage that dead corners may be formed.

At the bottom of the vessel is disposed an inlet pipe 2, through which the mixture of water, oil and soil is introduced.

This vessel contains a number of separation chambers, indicated generally by 3, 4, and 5, these chambers being disposed one above the other, concentrically around a central column 6.

The inlet 2 leads into a receiver chamber 7, which is provided with a top wall 8 extending in the form of a conical surface between the outside wall 1 and an inner jacket 9 concentrically surrounding the central column 6. This top wall 8 is provided with a large number of openings 10, through which the mixture can pass into the supply chamber 11 of the first separation chamber 3.

The mixture coming from the pipe 2 thus expands in the large annular space 7, which is bounded by the top wall 8 and the floor 12, the outer wall 1 and the inner jacket 9, and this flow entering via the pipe 2 will thus be brought to rest because of the large volume of the receiver chamber 7.

The mixture, not yet separated, now passes via the openings 10 into the supply chamber 11, which is bounded at the top by a more steeply inclined top wall 13 and a second, oppositely inclined top wall or partition 14. The top wall 13 extends steeply upwards from the jacket 9 to a separating wall 15, which is situated between a first bundle of plates 16 and a second bundle of plates 17.

Each bundle of plates consists of parallel plates 18 with, between them, an undulating plate, and in the example illustrated all the plates 18 extend concentrically around the central column 6.

The other top wall or partition 14 forms, with the top end of the top wall 13, an opening 19, while the bottom edge of this partition 14 forms at 20 an inlet opening or circumferential slit 21 with the outer wall 1, whereby a circumferential inlet passage 22 extending along the inside of the outer wall 1 is formed.

Between the top walls 13 and 14 are disposed partitions 23 extending radially in the supply chamber.

The liquid coming from the openings 10 into the supply chamber flows partly upwards between the walls 13 and 14 and via the opening 19 into the first bundle of plates 16, and also partly via the opening 21 likewise into the first bundle of plates 16 in the direction of the arrow 25. The remainder of the liquid introduced passes via the annular passage 22 further upwards to the next separation chamber 4.

In the bundle of plates 16 the mixture flows upwards in a laminar flow to a chamber 26, which functions as reversing chamber and which has substantially the same shape as the supply chamber 11. This reversing chamber 26 has a top wall 27, which has the same length and the same cone angle as the top wall 13, and also a short top wall 28, which has the same length and is situated in the same way as the top wall 14 of the supply chamber 11. Between the top walls 27 and 28 radially disposed partitions 29 are also once again provided.

The liquid which comes out of the first bundle 16 now reverses its direction, as shown by the arrow 30, and flows back downwards through the second bundle of plates 17, which is of the same construction.

During the passage through the first bundle of plates separation already takes place in the sense that the lightest component, the oil, moves upwards and in the top of the reversing chamber 26 flows upwards via the gap between the top edges of the top walls 27 and 28—which gap is given the reference 31—through the second bundle of plates of the following separation chamber.

Oil which separates out in the annular supply passage 22 will obviously also flow upwards and, by way of this chamber, collect at the top of the vessel at 32.

In the reversing chamber 26 the flow is likewise laminar, and it remains laminar as it passes through the second bundle of plates. When the liquid enters the second bundle of plates 17 the oil component has practically been separated out, and thus a mixture of water and soil or sludge is all that passes through the second bundle of plates. This mixture is now split up because the soil, on leaving the second bundle of plates, comes onto the top surface of the plate 13 and slides down along that surface, while the light component, water, remains in the discharge chamber 33 above the soil.

This discharge chamber contains radial partitions 33′, which bear against the central column 6. Partitions 23 and/or 29 and 29 and/or 33′ may extend into the spaces between the plates 18 of the first and second bundles of plates 16, 17, respectively.

This discharge chamber 33 now has a large outlet opening 34 at the inner jacket 9.

Between the column 6 and the jacket 9 is disposed a jacket 35 which, together with the outer surface of the column 6, forms a cylindrical outlet for soil, while between the jacket 35 and the jacket 9 the water which has been separated is collected.

Each bottom plate of the discharge chamber 33, such as the plate 13 or the plate 27, is extended, at the height of the connection to the jacket 9, in the form of a horizontal surface 36 which leads into the space between the jacket 35 and the column 6. This space is given the reference 37.

Soil which slides downwards over the plates 13, 27, etc., slides over the horizontal plate 36 into the cylindrical annular space 37, and flows downwards through it, whereupon it can be discharged via the soil discharge pipe 38.

In the space between the jackets 9 and 35 are disposed a number of vertical pipes 39, which are passed sealingly through the horizontal plates 36 and are closed at the bottom and open at the top at 40. These pipes 39 each have an inlet opening 41 under a plate 36.

Water which now flows upwards out of the outlet opening 35 along the bottom edge of the inner plate 42 of the second bundle of plates into the annular space 43 will now enter the pipe 39 via the opening 41 and flow upwards to form a level 44 where the water flows over the top edge 45 of the central column 6 and downwards through this column and can be discharged through the water outlet pipe 46.

Oil which collects at 32 can be collected with the aid of a vertically adjustable annular receiver tank 47 having an outlet pipe 48.

Each separation chamber 3, 4 and 5 is constructed in the same way. This means that the top walls, such as 13 and 14, of each supply chamber form the bottoms of, on the one hand, the discharge chambers, such as 33, under the second bundle of plates and, on the other hand, of the supply chambers through which, as indicated by the arrow 25, mixture can pass out of the annular passage 22 into the first bundle of plates.

All the separation chambers 3, 4 and 5 are thus in parallel with one another with respect to the supply from the annular passage 22 and with respect to the discharge of water and soil. With regard to the discharge of oil, we may also speak of a parallel connection with respect to the oil which is separated from the partial flows which in each case pass in the direction of the arrows 25 from the annular passage 22 into the first bundle of plates. However, oil which is separated in this bundle and in the reversing chamber, such as 26, and flows upwards through the gap 31, will then also flow through the adjoining first bundle of plates, so that this separate oil component flows serially through the separation chamber.

The apparatus shown in the drawing is constructed of concentrically disposed parts with the exception of the pipes 39 and the radial partitions, such as 23.

In its simplest form the apparatus according to the invention, however, consists of one separation chamber entirely constructed of flat plates between end walls lying parallel to the plane of the drawing, which flat plates are then formed by the plates 13, 14 on the one hand and 27, 28 on the other hand, the vertical plates 15, 42 and 49 bounding the bundles of plates, the vertical plates of the bundles of plates and the undulating plates disposed between them. The partitions 23 then do not extend radially, but are disposed parallel to one another and at right angles to the planes of the other plates. This substantially rectangular configuration may have any desired length or be grouped in any desired manner around a central part.

The mixture does not need to be supplied through a pipe 2 leading into the bottom of the vessel.

If the paths of flow are examined, it can easily be seen from the drawing that for each particle these paths are practically equal in length. The paths of flow through the bundles of plates are equal in length, while particles which in the reversing chamber pass through a shorter curve than particles which travel over a longer curve in the top of the chamber, will pass over a longer path than the particles which travelled a longer distance in the reversing chamber.

It can also easily be seen from the drawing that the apparatus may be so constructed that all parts of the separation chambers disposed one above the other may be removed in the upward direction when this is necessary for cleaning or maintenance purposes.

If desired, the apparatus may be closed at the top, optionally with a floating roof, and it may be so constructed that it can be placed entirely under the water being treated.

We claim:

1. An apparatus for continuously separating from each other the components of a mixture of water, oil and soil by gravitational segregation, which apparatus consists of a vessel provided with a supply pipe in its lower part to supply the mixture to be treated, a separate discharge outlet for each of oil, water and soil, and one or more separation chambers, wherein the vessel is provided with a receiver chamber (7) into which the supply pipe (2) leads, said receiver chamber (7) having a volume large enough to slow down the speed of flow of said mixture supplied by said supply pipe (2), a supply chamber (11) above and fluidly connected to the receiver chamber (7) and wherein each separation chamber comprises a first bundle of vertically arranged parallel plates (16) having passages therebetween, said supply chamber (11) having an opening (19) in its upper surface connected to said separation chamber (3) at an inlet to the openings of said passages for said first bundle (16), a second bundle of parallel plates (17) having vertical passages situated in said separation chamber (3) and being separated from said first bundle of plates (16) by a separating wall (15), a reversing chamber (26) situated above said first and second bundles (16,17), said reversing chamber (26) having inclined top walls (27,28) extending from the uppermost portions of the farthest apart ends of said first and second bundles (16,17) to a point above the separating wall (15) and forming an outlet opening (13) through which oil is discharged, and an inclined floor located beneath the vertical plates of said second bundle (17) and forming a discharge chamber (33), said inclined floor extending from said separating wall (15) to a discharge opening where a guide plate (36) adjoining said inclined floor (13) is connected to the soil discharge outlet and an outlet opening (34) is connected to the water discharge outlet.

2. An apparatus of claim 1, wherein both the supply chamber (11) and the reversing chamber (26) contain vertical partitions (23,29) which lie transversely to the planes of the plates of the first and second bundles of plates (16,17).

3. An apparatus of claim 2, wherein the first and second bundles of plates (16,17) have between the plates partitions which lie in the same plane as the partitions (23,29) of said supply chamber (11) and said reversing chamber (26).

4. An apparatus of claim 1, wherein each discharge chamber (33) is provided with vertical partitions (33') which lie transversely to the planes of the plates of the first and second bundles of plates (16,17).

5. An apparatus of claim 4, wherein the first and second bundles of plates (16,17) have between the plates partitions which lie in the same plane as the partitions (33') of each discharge chamber (33).

6. An apparatus of claim 1, wherein said supply chamber (11) and said reversing chamber (26) have the same volumes between the respective top walls (13,14 and 27,28, respectively).

7. An apparatus of claim 1, wherein the plates of the first and second bundles of plates (16,17) are of the same height.

8. An apparatus of claim 1, wherein the vessel contains a plurality of separation chambers (3,4,5) which are disposed one above the other and are connected in parallel with one another to the supply inlet (2) to the respective water and soil outlets and which with respect to the separation of the oil component are at least partly disposed serially.

9. An apparatus of claim 8, wherein said top wall (27) disposed above said second bundle of plates (17) in each reversing chamber (26) is, with the exception of the uppermost separation chamber, also the inclined floor (13) of each discharge chamber (33).

10. An apparatus of claim 1, wherein the top wall (14) in conjunction with the outside wall (49) of said first bundle of plates (16) forms an additional inlet (25) for the mixture to pass to said first bundle of plates (16).

11. An apparatus of claim 1, wherein the apparatus is provided at the bottom edge of each inclined floor (13) at the site of the outlet opening (34) of the discharge chamber (33) with said guide plate (36) which leads into a soil outlet pipe (37) and through which one or more vertical pipes (39) are sealingly guided, said vertical pipes (39) having under said guide plate (36) an inlet opening for water from said outlet opening (34).

12. An apparatus of claim 1, wherein the vessel is a cylinder; a central column (6) is disposed in the center of said vessel; a water outlet pipe (46) is connected to said central column (6); a first jacket (33) is disposed concentrically around said column (6) with openings (37) above the guide plate (36) of each inclined floor (13); said first jacket (35) forms with said central column (6) a soil collecting pipe which is connected to said soil discharge pipe (38); a second jacket (9) is disposed concentrically around said first jacket (35) with openings (34) above each inclined floor (13); in the space between said first jacket (35) and said second jacket (9) vertical pipes (39) are disposed with water inlet openings (41) under each guide plate (36) and with an outlet opening (40) at the top end; each inclined floor (13) or top wall (27) is a conical plate having a downwardly and inwardly directed apex angle; each top wall plate (14) is a conical plate having an upwardly directed apex angle; and the plates of said first and second bundles of plates (16,17) are cylindrical plates.

13. An apparatus of claim 12, wherein undulating plates are disposed between the cylindrical plates of said first and second bundles of plates (16,17).

14. An apparatus of claim 1, wherein the soil is comprised as sludge.

* * * * *

UNITED STATES PATENT AND TRADEMARK OFFICE
CERTIFICATE OF CORRECTION

PATENT NO. : 4,589,984

DATED : May 20, 1986

INVENTOR(S) : HUBRECHT LEVINUS LEGRAND et al.

It is certified that error appears in the above-identified patent and that said Letters Patent is hereby corrected as shown below:

Column 6, Claim 1, line 28, "opening (13)" should read

-- opening (31) --.

Signed and Sealed this

Twenty-eighth Day of October, 1986

[SEAL]

*Attest:*

DONALD J. QUIGG

*Attesting Officer*     *Commissioner of Patents and Trademarks*